(12) United States Patent
Ogawa (10) Patent No.: US 11,321,001 B2
(45) Date of Patent: May 3, 2022

(54) INFORMATION PROCESSING APPARATUS EQUIPPED WITH STORAGE USING FLASH MEMORY, CONTROL METHOD THEREFOR, AND STORAGE MEDIUM

(71) Applicant: CANON KABUSHIKI KAISHA, Tokyo (JP)

(72) Inventor: Tatsuya Ogawa, Tsukuba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 123 days.

(21) Appl. No.: 16/839,482

(22) Filed: Apr. 3, 2020

(65) Prior Publication Data
US 2020/0333967 A1  Oct. 22, 2020

(30) Foreign Application Priority Data
Apr. 17, 2019 (JP) .............................. JP2019-078722

(51) Int. Cl.
*G06F 3/06* (2006.01)
*G06F 1/3234* (2019.01)

(52) U.S. Cl.
CPC .......... *G06F 3/0634* (2013.01); *G06F 1/3275* (2013.01); *G06F 3/064* (2013.01); *G06F 3/0604* (2013.01); *G06F 3/0652* (2013.01); *G06F 3/0659* (2013.01); *G06F 3/0679* (2013.01)

(58) Field of Classification Search
CPC ...... G06F 3/0634; G06F 3/0604; G06F 3/064; G06F 1/3275; G06F 3/0659; G06F 3/0679; G06F 3/0652; G06F 1/3225; G06F 1/3287; G06F 3/0616; Y02D 10/00
See application file for complete search history.

(56) References Cited

U.S. PATENT DOCUMENTS

| 2015/0268873 | A1* | 9/2015 | Gibbons | G06F 3/0616 711/102 |
| 2018/0275915 | A1* | 9/2018 | Ke | G06F 3/0652 |
| 2018/0276123 | A1* | 9/2018 | Matsudaira | G06F 12/0276 |
| 2019/0095116 | A1* | 3/2019 | Igahara | G06F 3/0619 |
| 2019/0272098 | A1* | 9/2019 | Muchherla | G06F 12/0246 |
| 2020/0151052 | A1* | 5/2020 | Qawami | G06F 3/0656 |

FOREIGN PATENT DOCUMENTS

| JP | 2007193883 A | 8/2007 |
| JP | 2018156600 A | 10/2018 |

* cited by examiner

*Primary Examiner* — Francisco A Grullon
(74) *Attorney, Agent, or Firm* — Rossi, Kimms & McDowell LLP (57) ABSTRACT

An information processing apparatus which is capable of preventing a malfunction of a storage using flash memory caused by a decrease in the number of free blocks. The information processing apparatus controls a storage that includes a nonvolatile memory and a memory controller that controls the nonvolatile memory. The number of free blocks in the nonvolatile memory is detected, and in accordance with the detected number of free blocks, the memory controller is instructed to switch to one of the following writing modes: a first writing mode in which the memory controller writes data to the nonvolatile memory without performing garbage collection, and a second writing mode in which the memory control unit writes data to the nonvolatile memory and then performs garbage collection.

10 Claims, 5 Drawing Sheets

INFORMATION PROCESSING APPARATUS EQUIPPED WITH STORAGE USING FLASH MEMORY, CONTROL METHOD THEREFOR, AND STORAGE MEDIUM

BACKGROUND OF THE INVENTION

Field of the Invention

The present invention relates to an information processing apparatus equipped with a storage using flash memory, a control method therefor, and a storage medium.

Description of the Related Art

In general, a hard disk drive (HDD) is used as a storage for an information processing apparatus such as an image forming apparatus. For example, programs are stored and image data is saved/edited on such an HDD.

In recent years, with increase in the capacity of and decrease in the prices of storages using flash memory in particular, a solid-state drive (SSD), they are rapidly coming into widespread use mainly for personal computers such as mobile PCs.

As compared to an HDD, an SSD can be randomly accessed at high speed, and in addition, has advantages of reducing power consumption, saving weight, and saving space. Moreover, an SSD does not require initial operations such as spinning up which is required for an HDD at system startup, and hence the boot time of an SSD is much shorter than that of an HDD. Furthermore, as distinct from an HDD, an SSD has no disk drive part that is easily broken by a shock, and hence it is advantageous in terms of shock resistance and heat resistance. For these reasons, SSDs are drawing attention as storages for an image forming apparatuses.

However, data can be written to flash memory, which is a storage device incorporated in an SSD, only a limited number of times, and the limited number of times varies with types of flash memory. For example, data can be written on SLC (Single Level Cell) about one hundred thousand times, and data can be written on MLC (Multiple Level Cell) about ten thousand times. Moreover, due to miniaturization of semiconductors, the number of times that data can be written on flash memory tends to decrease.

To deal with the upper limit to the number of writes on flash memory, a memory control unit incorporated in an SSD averages out the number of writes across areas in which data is written so as to prevent data from being written too frequently in the same area of flash memory. This prolongs the life of flash memory, and by extension, an SSD which is a storage equipped with flash memory. This technique is called wear leveling.

Moreover, data is erased in units called blocks by applying voltage to an area in which data to be erased is stored in a direction opposite to a direction in which voltage is applied at the time of writing (see Japanese Laid-Open Patent Publication (Kokai) No. 2007-193883 and Japanese Laid-Open Patent Publication (Kokai) No. 2018-156600). Data erasure using this method will hereafter be referred to as garbage collection.

Garbage collection described in Japanese Laid-Open Patent Publication (Kokai) No. 2007-193883 and Japanese Laid-Open Patent Publication (Kokai) No. 2018-156600 is performed by the memory control unit incorporated in the SSD based on a result of determination as to whether or not conditions for performing garbage collection are satisfied.

Namely, according to the prior arts, a host apparatus equipped with an SSD as a storage cannot determine whether or not conditions for performing garbage collection are satisfied, or based on a result of the determination, send a command to perform garbage collection to the SSD. The conditions for performing garbage collection vary with specifications of the memory control unit.

On the other hand, one of conditions for occurrence of a return status error, of which the host apparatus is notified by the SSD, is that the number of blocks in which no data is stored (hereafter referred to as "the number of free blocks") is equal to or smaller than a predetermined value. Namely, depending on specifications of the memory control unit, garbage collection will not be performed even if the number of free blocks has decreased to such an extent that processing by the memory control unit becomes impossible. This causes a malfunction of the SSD.

SUMMARY OF THE INVENTION

The present invention provides an information processing apparatus, a control method therefor, and a non-transitory computer-readable storage medium storing a program for causing a computer to execute the control method, which are capable of preventing a malfunction of a storage using flash memory caused by a decrease in the number of free blocks.

Accordingly, a first aspect of the present invention provides an information processing apparatus that controls a storage including a nonvolatile memory and a memory controller that controls the nonvolatile memory. The information processing apparatus comprises a memory device that stores a set of instructions; and at least one processor that executes the set of instructions. In accordance with the instructions, the at least one processor detects the number of free blocks in the nonvolatile memory; and gives the memory controller an instruction to switch to one of a first writing mode and a second writing mode in accordance with the detected number of free blocks. The first writing mode is a writing mode in which the memory controller is caused to write data to the nonvolatile memory without performing garbage collection, and the second writing mode is a writing mode in which the memory controller is caused to write data to the nonvolatile memory and perform garbage collection after writing the data.

Accordingly, a second aspect of the present invention provides a control method for an information processing apparatus that controls a storage including a nonvolatile memory and a memory controller that controls the nonvolatile memory. The control method comprises: detecting the number of free blocks in the nonvolatile memory; and giving the memory controller an instruction to switch to one of a first writing mode and a second writing mode in accordance with the detected number of free blocks. The first writing mode is a writing mode in which the memory controller is caused to write data to the nonvolatile memory without performing garbage collection, and the second writing mode is a writing mode in which the memory controller is caused to write data to the nonvolatile memory and perform garbage collection after writing the data.

According to the present invention, a malfunction of a storage using flash memory caused by a decrease in the number of free blocks is prevented.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
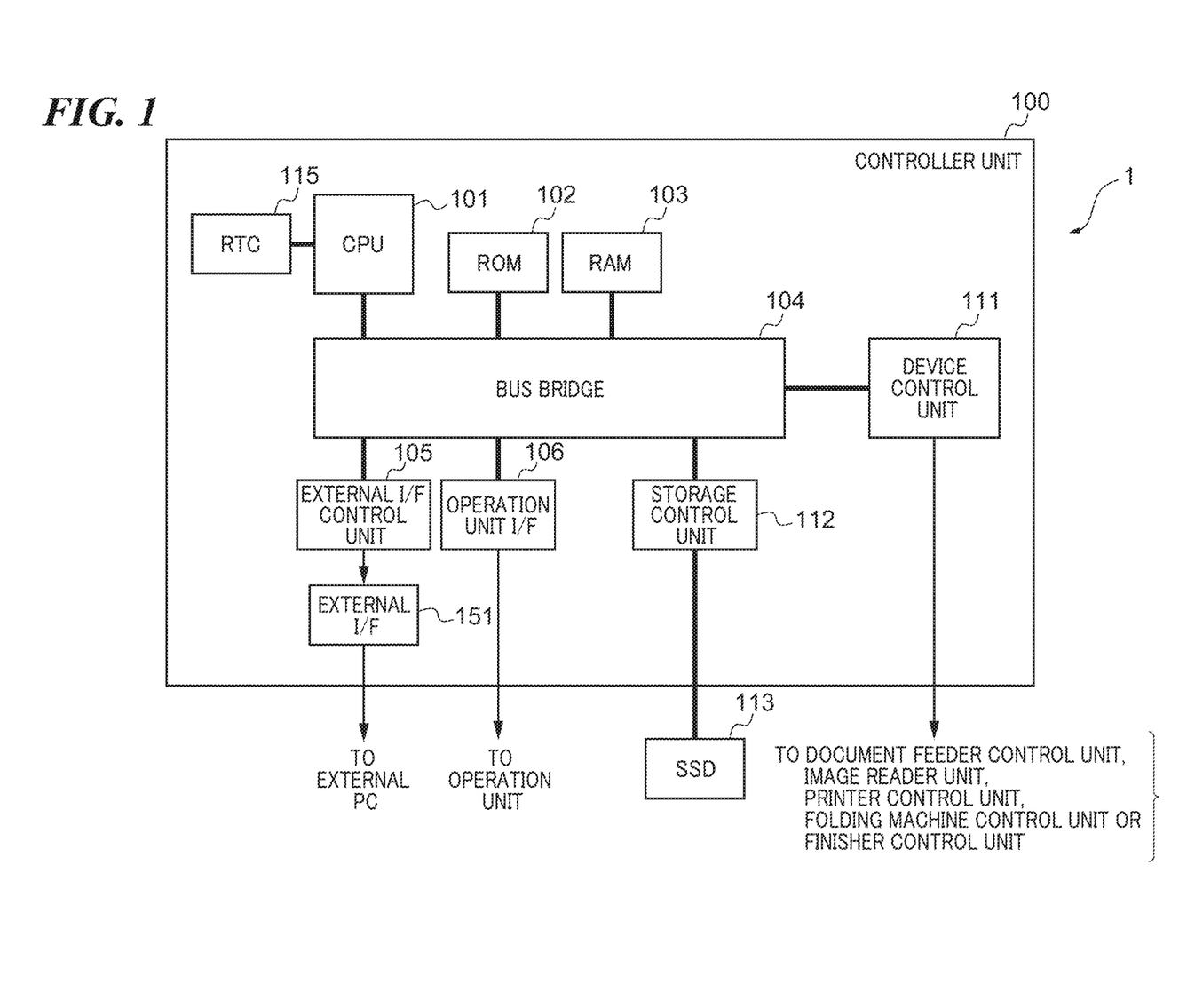
FIG. 1 is a block diagram showing an arrangement of a controller unit which an image forming apparatus as an information processing apparatus according to a first embodiment has.

FIG. 1 is a block diagram showing an arrangement of a controller unit 100 which an image forming apparatus 1 as an information processing apparatus according to a first embodiment has.

The controller unit 100 includes a CPU 101, a ROM 102, and a bus bridge 104. The CPU 101 is controlled based on an operating system (hereafter referred to as the OS). The CPU 101, which is connected to a real-time clock (hereafter referred to as the RTC) 115 and the bus bridge 104, reads an initial starting program for the CPU 101 from the ROM 102 via the bus bridge 104. The CPU 101 also includes a timer, not shown, incorporated therein.

A RAM 103, an external I/F control unit 105, an operation unit interface (operation unit I/F) 106, a device control unit 111, and a storage control unit 112 as well as the CPU 101 and the ROM 102 are connected to the bus bridge 104.

The RAM 103 is used as a work area for the CPU 101 to perform computations associated with control.

The operation unit interface (operation unit I/F) 106 is connected to an operation unit, and the CPU 101 controls the operation unit via the operation unit I/F 106.

The storage control unit 112 turns on and off the power to an SSD 113 and stores programs and saves/edits data on the SSD 113, in accordance with instructions from the CPU 101.

Image data as well as main programs including the OS for the CPU 101 is stored on the SSD 113. Examples of the image data include image data obtained using an image reader or from an external PC via an external interface (external I/F) 151, and image data created by user's operation on the operation unit. Application programs, preference data, and so forth are also stored on the SSD 113. The preference data includes information on user settings such as settings for the appearance of the operation unit and the time required to shift to a power-saving mode (that is, setting information) and registration information such as an address book. It should be noted that although the information processing apparatus according to the first embodiment is the image forming apparatus 1, it may be any other information processing apparatus other than the image forming apparatus 1 as long as it is equipped with the SSD 113 as a storage. For example, the information processing apparatus according to the first embodiment may be a video camera. In this case, data written on the SSD 113 is video data and audio data rather than image data.

The external/F control unit 105 controls the external I/F 151. The external I/F 151 includes a network, a USB interface, and so forth, so as to be connected to an external PC via the network or an external bus such as a USB. For example, the external I/F 151 expands print data, which has been received from the external PC, into image data and outputs the image data, and sends image data on the SSD 113, which will be described later, to the external PC.

The operation unit I/F 106 is connected to the operation unit and responsible for controlling it.

The device control unit 111 is connected to a document feeder control unit, an image reader control unit, a printer control unit, a folding machine control unit, and a finisher control unit, which are not shown in the drawings, and is responsible for controlling them.

The controller unit 100 receives instructions from the operation unit and the external PC via the operation unit I/F 106 and the external I/F 151, respectively. Based on the received instructions, the controller unit 100 carries out communications with the document feeder control unit and the image reader control unit via the device control unit 111 to obtain input image data on originals. The controller unit 100 also carries out communications with the printer control unit via the device control unit 111 to form images on recording media such as sheets based on the obtained image data. Further, the controller unit 100 carries out communications with the folding machine control unit and the finisher control unit to fold the sheets with the images formed thereon and perform post-processing such as stapling and punching.

The RTC 115 is capable of obtaining current time and notifies the CPU 101 of a time stamp indicating the obtained current time.

Figure 2:
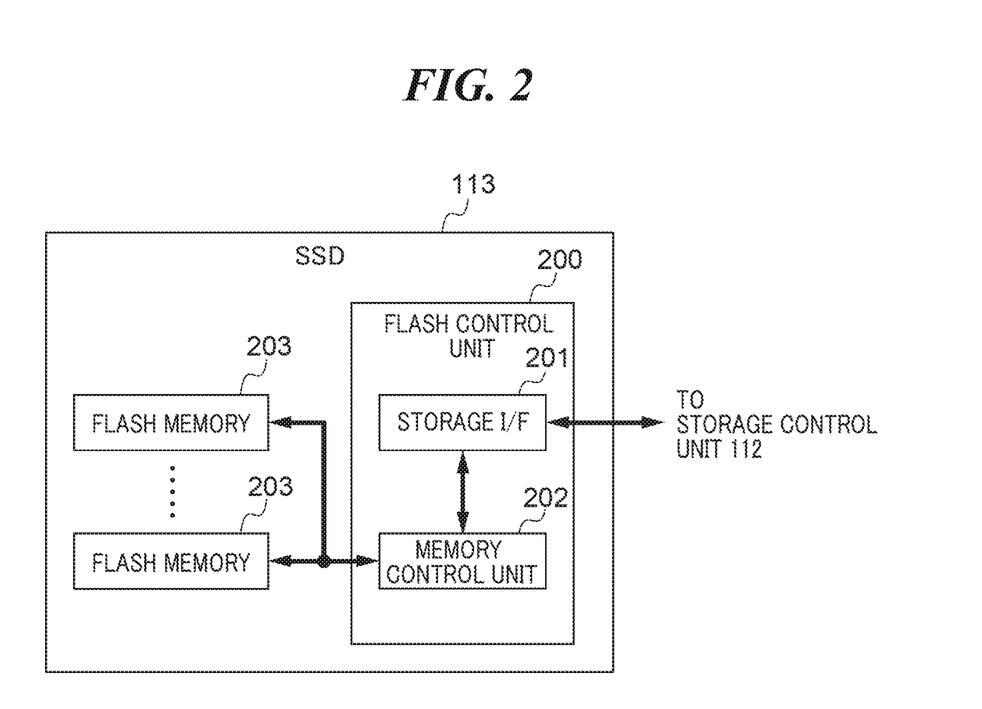
FIG. 2 is a block diagram showing an internal arrangement of an SSD in FIG. 1.

FIG. 2 is a block diagram showing an internal arrangement of the SSD 113 in FIG. 1.

The SSD 113 includes a flash control unit 200 and a plurality of flash memories 203 which are nonvolatile memories.

The flash control unit 200 includes a storage L/F 201 and a memory control unit 202, which is also referred to as a memory controller. The storage I/F 201 is connected to a storage control unit 112. Namely, the storage I/F 201 is a module for communicating with the storage control unit 112. In the first embodiment, a serial ATA (Serial AT Attachment: hereafter referred to as SATA) interface is used as the storage IF 201.

The memory control unit 202 reads and writes data from and into the flash memory 103 based on instructions received from the storage control unit 112 via the storage I/F 201.

The memory control unit 202 switches to one of a first writing mode and a second writing mode in accordance with a writing mode switching instruction from the controller unit 100 of the image forming apparatus 1, which will be described later. Then, the memory control unit 202 performs processing on the flash memory 203 in accordance with the selected writing mode.

In the first writing mode, the memory control unit 202 carries out a process in which it writes writing data onto a page on which no data in the flash memory 203 is stored (hereafter referred to as a "free page").

In the second writing mode, first, the memory control unit 202 carries out a process in which it writes writing data into a block of the flash memory 203 in which no data is stored (hereafter referred to as a "free block"). Then, the memory control unit 202 carries out a process (garbage collection) in which it copies necessary data present in a block that includes data to be erased to the block in which the writing data has been stored and erases the data in the block from which the data has been copied.

It should be noted that blocks are units in which the flash memory 203 is erased, and they are larger than pages which are units in which data is accessed.

SMART information that manages the number of free blocks and others as will be described later is stored in the flash memory 203. In response to an instruction from the storage control unit 112, the memory control unit 202 obtains the SMART information from the flash memory 203 and provides a notification to the storage control unit 112 via the storage I/F 201.

Figure 3:
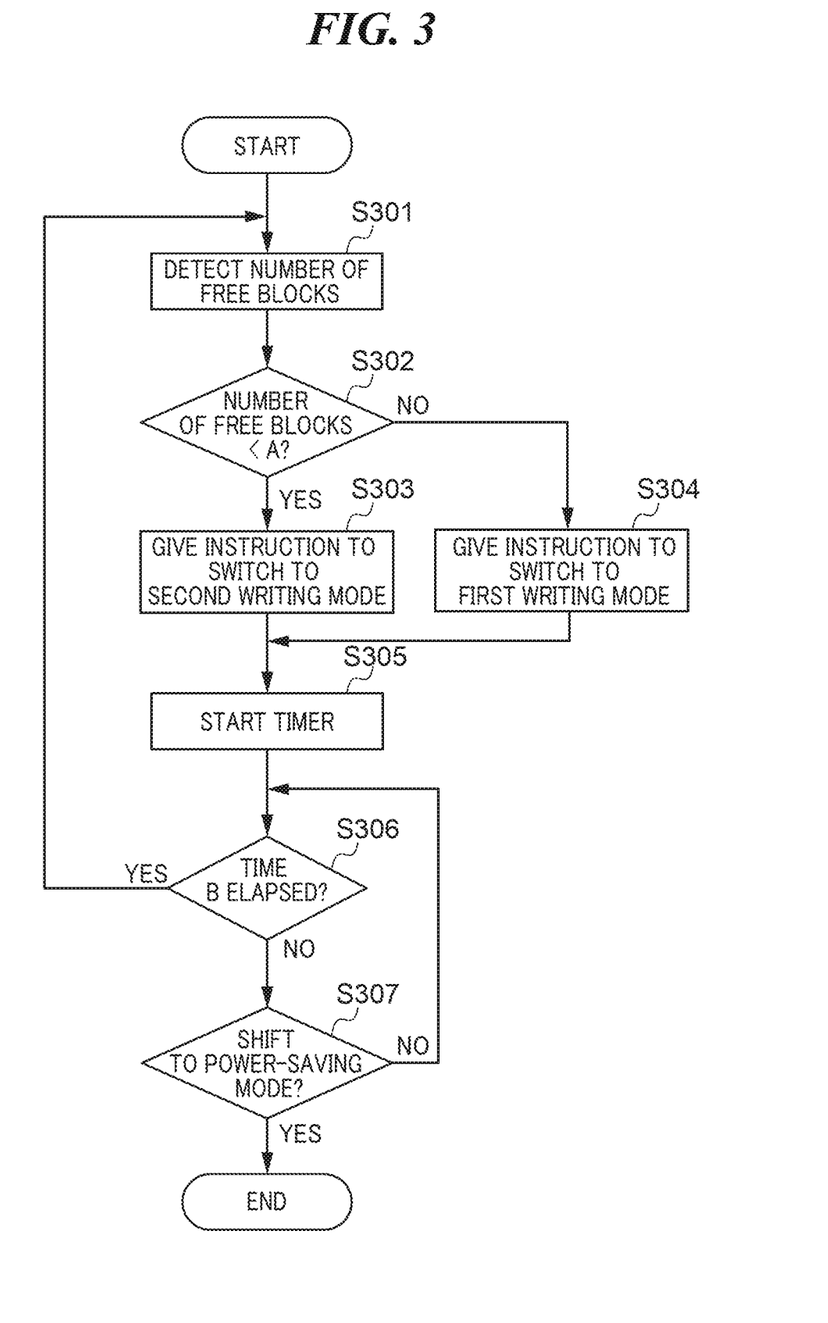
FIG. 3 is a flowchart of a writing mode switching process in the first embodiment.

FIG. 3 is a flowchart of a writing mode switching process in the first embodiment. It should be noted that the writing mode switching process in FIG. 3 is started in response to the CPU 101 of the controller unit 100 in FIG. 1 turning on the power to the SSD 113 via the storage control unit 112.

In step S301, first, the CPU 101 requests the memory control unit 202 to provide the SMART information. In response to this request, the memory control unit 202 obtains the SMART information managed in the flash memory 203 and provides a notification to the CPU 101. In response to this notification, the CPU 101 obtains the SMART information and detects the number of free blocks in the flash memory 203, which is included in the SMART information.

It should be noted that, in the SMART information, a disk overview (a manufacturer, a model number, a serial number, etc.) and a disk status (temperature, the number of bad sectors, operating hours, etc.), and so forth as well as the number of free blocks in the flash memory 203 are registered.

In step S302, the CPU 101 judges whether or not the number of free blocks in the flash memory 203 detected in the step S301 is smaller than a threshold value A for the number of free blocks which has been set in advance (hereafter referred to merely as the threshold value A). As a result of the judgment, when the number of free blocks in the flash memory 203 is smaller than the threshold value A (YES in the step S302), the process proceeds to step S303. On the other hand, as a result of the judgment, when the number of free blocks in the flash memory 203 is equal to or greater than the threshold value A (NO in the step S302), the process proceeds to step S304. It should be noted that a value greater than a value at which a malfunction of the memory control unit 202 occurs is set as the threshold value A.

In the step S303, the CPU 101 instructs the memory control unit 202 to switch the writing mode to the second writing mode. In parallel with this instruction, the CPU 101 requests the RTC 115 to provide a time stamp indicating current time.

In the step S304, the CPU 101 instructs the memory control unit 202 to switch the writing mode to the first writing mode. In parallel with this instruction, the CPU 101 requests the RTC 115 to provide a time stamp indicating current time.

In the step S305, the CPU 101 checks the time stamp, which has been provided by the RTC 115 in accordance with the request given in the step S303 or S304, and causes the timer to start measuring elapsed time.

In step S306, the CPU 101 judges whether or not the elapsed time measured by the timer is longer than a time B set in advance. As a result of the judgment, when the elapsed time measured by the timer is longer than the time B (YES in the step S306), the CPU 101 determines that the process in the writing mode selected in accordance with the instruction in one of the steps S303 and S304 was carried out by the memory control unit 202 within the time B and resets the timer. Then, the process returns to the step S301 so that the instruction in one of the steps S303 and S304 can be issued again. On the other hand, as a result of the judgment, when the elapsed time measured by the timer is not longer than the time B (NO in the step S306), the process proceeds to step S307.

In the step S307, based on the preference data stored on the SSD 113, the CPU 101 judges whether or not the image forming apparatus 1 has shifted to the power saving mode. As a result of the judgment, when the image forming apparatus 1 has shifted to the power saving mode (YES in the step S307), the CPU 101 shuts off the power to the SSD 113 and ends the present process. On the other hand, as a result of the judgment, when the image forming apparatus 1 has not shifted to the power saving mode (NO in the step S307), the process returns to the step S306. It should be noted that in the step 307, whether or not the image forming apparatus 1 has shifted to a state in which the power to the SSD 113 is to be shut off has only to be judged. For example, whether or not the image forming apparatus 1 is to be shut down may be judged in the step S307.

According to the first embodiment described above, upon judging that the number of free blocks in the flash memory 203 is smaller than the threshold value A, the CPU 101 instructs the memory control unit 202 to switch to the second writing mode in which garbage collection is performed after data is written. As a result, data to be erased is timely erased from the flash memory 203, and hence a malfunction of the SSD 113 caused by a decrease in the number of free blocks can be prevented.

Further, the CPU 101 makes the above judgment again after the time B has elapsed since the switching instruction was issued. As a result of the judgment, when the number of free blocks in the flash memory 203 is not smaller than the threshold value A, the CPU 101 instructs the memory control unit 202 to switch to the first writing mode in which data is written without performing garbage collection. As a result, performance degradation of the SSD 113 caused by garbage collection performed in the second writing mode can be reduced.

A description will now be given of a second embodiment. It should be noted that in the following description of the second embodiment, the same component elements and steps as those in the first embodiment are denoted by the same reference numerals, and description thereof is omitted.

Figure 4:
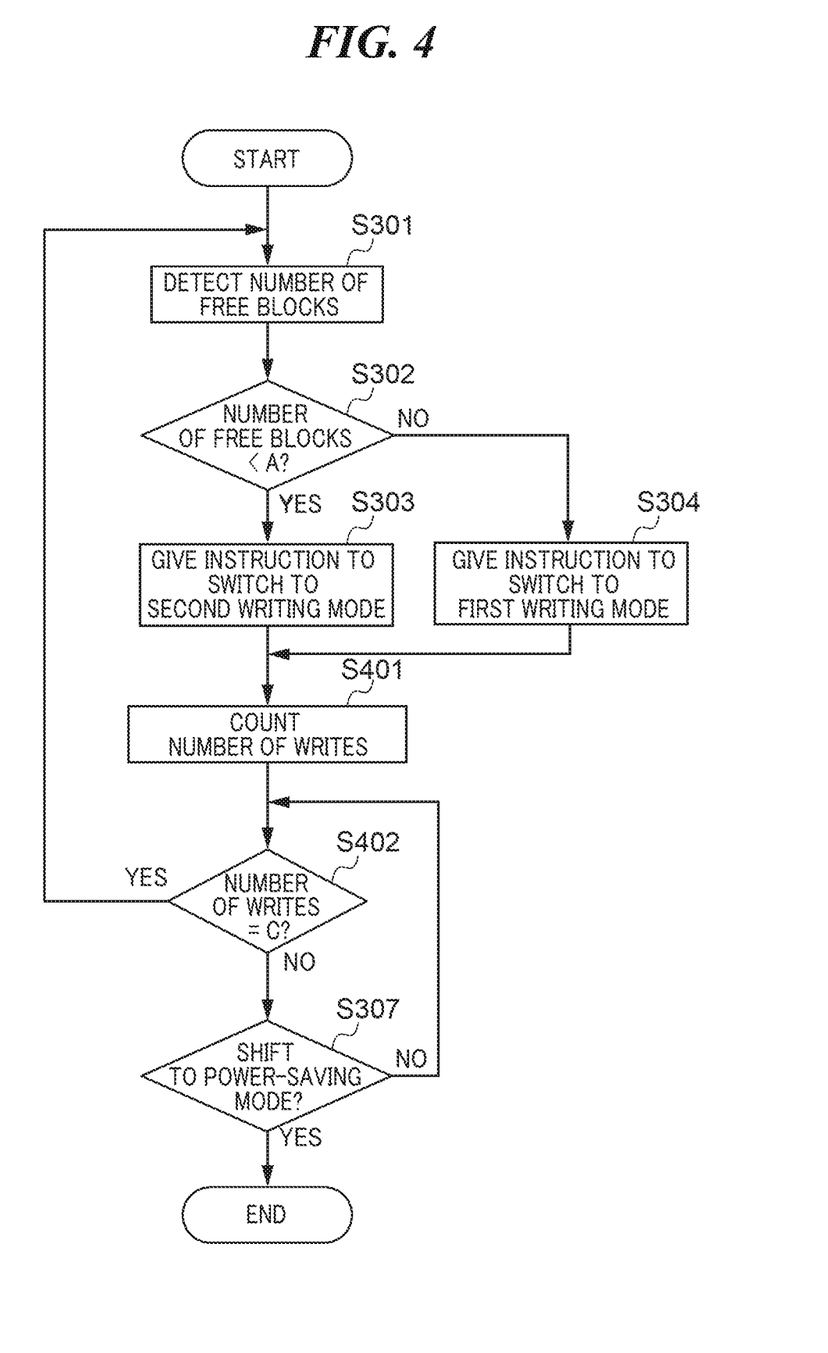
FIG. 4 is a flowchart of a writing mode switching process in a second embodiment.

FIG. 4 is a flowchart useful in explaining a writing mode switching process in the second embodiment. It should be noted that as with the process in FIG. 3, the writing mode switching process in FIG. 4 is started by the CPU 101 of the controller unit 100 in FIG. 1 turning on the power to the SSD 113 via the storage control unit 112.

First, when the present process is started, the same processes as those in the steps S301 to S304 are carried out. In the steps S304 an S304, however, the CPU 101 does not request the RTC 115 to provide a time stamp indicating current time.

Next, in step S401, after completing switching of the writing mode in the step S303 or S304, the CPU 101 counts the number of times that data has been written to the SSD 113.

In step S402, the CPU 101 judges whether or not the counted number of writes has reached a value C set in advance. As a result of the judgment, when the counted number of writes has reached the value C (YES in the step S402), the counted number of writes is reset, and the process then returns to the step S301. On the other hand, as a result of the judgment, when the counted number of writes has not reached the value C (NO in the step S402), the process proceeds to the step S307.

In the step S307, the same process as in FIG. 3 is carried out.

According to the second embodiment described above, when the CPU 101 judges that the number of times that data has been written to the SSD 113 has reached the value C after instructing the memory control unit 202 to switch to the second writing mode, the CPU 101 instructs the memory control unit 202 to switch to the first writing mode. As a result, performance degradation of the SSD 113 caused by garbage collection performed in the second writing mode can be reduced.

A description will now be given of a third embodiment. It should be noted that in the following description of the third embodiment, the same component elements and steps as those in the first embodiment are denoted by the same reference numeral, and description thereof is omitted.

Figure 5:
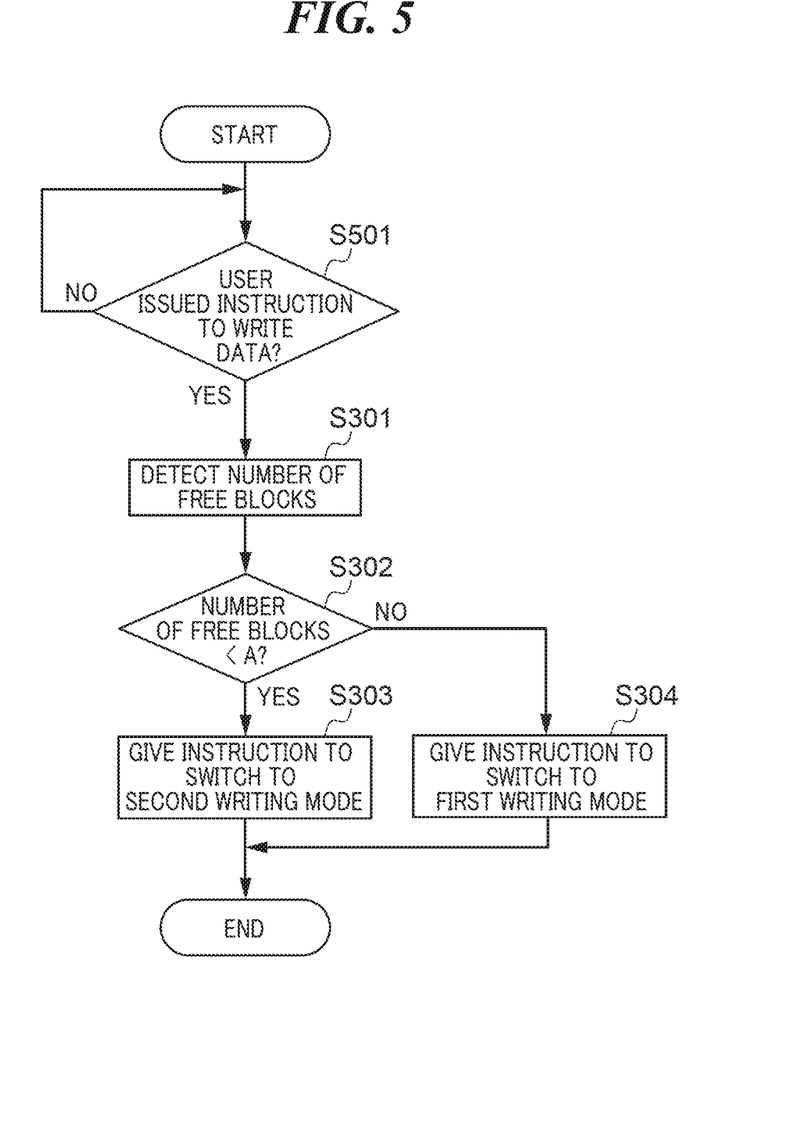
FIG. 5 is a flowchart of a writing mode switching process in a third embodiment.

FIG. 5 is a flowchart useful in explaining a writing mode switching process in the third embodiment.

First, in step S501, the CPU 101 of the controller unit 100 in FIG. 1 judges whether or not a user's instruction to write data to the SSD 113 has been issued on the operation unit. As a result of the judgment, when the user's instruction to write data has been issued, the same processes as those in the steps S301 to S304 are carried out, and the present process is then ended. In the steps S304 an S304, however, the CPU 101 does not request the RTC 115 to provide a time stamp indicating current time.

According to the third embodiment described above, each time when receiving a user's instruction to write data to the SSD 113, the CPU 101 judges whether or not the number of free blocks in the flash memory 203 has become lower than the threshold value A. As a result of the judgment, when the number of free blocks in the flash memory 203 has become lower than the threshold value A, the CPU 101 instructs the memory control unit 202 to switch to the second writing mode in which garbage collection is performed after data is written. On the other hand, as a result of the judgment, when the number of free blocks in the flash memory 203 has not become lower than the threshold value A, the CPU 101 instructs the memory control unit 202 to switch to the first writing mode in which data is written without performing garbage collection. As a result, data to be erased is timely erased from the flash memory 203, and hence a malfunction of the SSD 113 caused by a decrease in the number of free blocks can be prevented.

It should be noted that although in the first to third embodiments, the method is used to prevent a malfunction of the SSD 113 caused by a decrease in the number of free blocks, the present invention is not limited to this. For example, the method in the first to third embodiments described above may be applied to other storages using flash memory, for example, eMMC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-078722, filed Apr. 17, 2019, which is hereby incorporated by reference herein in its entirety.

What is claimed is:

1. An information processing apparatus that controls a storage including a nonvolatile memory and a memory controller that controls the nonvolatile memory, the information processing apparatus comprising:
   a memory device that stores a set of instructions; and
   at least one processor that executes the set of instructions to:
   detect the number of free blocks in the nonvolatile memory; and
   give the memory controller an instruction to switch to one of a first writing mode and a second writing mode in accordance with the detected number of free blocks,
   wherein the first writing mode is a writing mode in which the memory controller is caused to write data to the nonvolatile memory without performing garbage collection, and the second writing mode is a writing mode in which the memory controller is caused to write data to the nonvolatile memory and perform garbage collection after writing the data,
   wherein the at least one processor executes instructions in the memory device to, upon determining that the number of times that data has been written to the nonvolatile memory has reached a value set in advance after giving the memory controller the instruction to switch to one of the first writing mode and the second writing mode, give the memory controller an instruction to switch to one of the first writing mode and the second writing mode in accordance with the number of free blocks in the nonvolatile memory.

2. The information processing apparatus according to claim 1, wherein the at least one processor executes instructions in the memory device to, upon determining that the number of free blocks in the nonvolatile memory has become smaller than a threshold value, give the memory controller an instruction to switch to the second writing mode.

3. The information processing apparatus according to claim 1, wherein the at least one processor executes instructions in the memory device to, upon determining that the number of free blocks in the nonvolatile memory has become equal to or greater than a threshold value, give the memory controller an instruction to switch to the first writing mode.

4. The information processing apparatus according to claim 1, wherein the at least one processor executes instructions in the memory device to, upon determining that time set in advance has elapsed after giving the memory controller the instruction to switch to one of the first writing mode and the second writing mode, give once again the memory controller an instruction to switch to one of the first writing mode and the second writing mode in accordance with the number of free blocks in the nonvolatile memory.

5. The information processing apparatus according to claim 4, wherein the at least one processor executes instructions in the memory device to, in response to power to the storage being turned on, give the memory controller the instruction to switch to one of the first writing mode and the second writing mode in accordance with the number of free blocks in the nonvolatile memory.

6. The information processing apparatus according to claim 1, wherein the at least one processor executes instructions in the memory device to, in response to power to the storage being turned on, give the memory controller the instruction to switch to one of the first writing mode and the second writing mode in accordance with the number of free blocks in the nonvolatile memory.

7. The information processing apparatus according to claim 1, wherein the at least one processor executes instructions in the memory device to, each time when receiving a user's instruction for data writing, give the memory controller an instruction to switch to one of the first writing mode and the second writing mode in accordance with the number of free blocks in the nonvolatile memory.

8. The information processing apparatus according to claim 1, wherein the at least one processor executes instructions in the memory device to obtain information on the number of free blocks from the nonvolatile memory via the memory controller.

9. A control method for an information processing apparatus that controls a storage including a nonvolatile memory and a memory controller that controls the nonvolatile memory, the control method comprising:

detecting the number of free blocks in the nonvolatile memory; and giving the memory controller an instruction to switch to one of a first writing mode and a second writing mode in accordance with the detected number of free blocks, wherein the first writing mode is a writing mode in which the memory controller is caused to write data to the nonvolatile memory without performing garbage collection, and the second writing mode is a writing mode in which the memory controller is caused to write data to the nonvolatile memory and perform garbage collection after writing the data, wherein, upon determining that the number of times that data has been written to the nonvolatile memory has reached a value set in advance after giving the memory controller the instruction to switch to one of the first writing mode and the second writing mode, giving the memory controller an instruction to switch to one of the first writing mode and the second writing mode in accordance with the number of free blocks in the nonvolatile memory.

10. A non-transitory computer-readable storage medium storing a program for causing a computer to execute a control method for an information processing apparatus that controls a storage including a nonvolatile memory and a memory controller that controls the nonvolatile memory, wherein the control method comprises:

detecting the number of free blocks in the nonvolatile memory; and giving the memory controller an instruction to switch to one of a first writing mode and a second writing mode in accordance with the detected number of free blocks, wherein the first writing mode is a writing mode in which the memory controller is caused to write data to the nonvolatile memory without performing garbage collection, and the second writing mode is a writing mode in which the memory controller is caused to write data to the nonvolatile memory and perform garbage collection after writing the data, wherein, upon determining that the number of times that data has been written to the nonvolatile memory has reached a value set in advance after giving the memory controller the instruction to switch to one of the first writing mode and the second writing mode, giving the memory controller an instruction to switch to one of the first writing mode and the second writing mode in accordance with the number of free blocks in the nonvolatile memory.

* * * * *